(12) United States Patent
Finkelstein et al.

(10) Patent No.: US 8,452,795 B1
(45) Date of Patent: May 28, 2013

(54) GENERATING QUERY SUGGESTIONS USING CLASS-INSTANCE RELATIONSHIPS

(75) Inventors: Lev Finkelstein, Netanya (IL); Fernando Pereira, Menlo Park, CA (US); Marius Pasca, New York, NY (US)

(73) Assignee: Google Inc., Mountain View, CA (US)

( * ) Notice: Subject to any disclaimer, the term of this patent is extended or adjusted under 35 U.S.C. 154(b) by 34 days.

(21) Appl. No.: 12/759,608

(22) Filed: Apr. 13, 2010

Related U.S. Application Data (60) Provisional application No. 61/295,664, filed on Jan. 15, 2010.

(51) Int. Cl.
*G06F 17/30* (2006.01)
*G06F 7/00* (2006.01)

(52) U.S. Cl.
USPC ............................. 707/767; 707/713; 707/771

(58) Field of Classification Search
USPC .......................................... 707/765, 766, 767
See application file for complete search history.

(56) References Cited

U.S. PATENT DOCUMENTS

| | | | |
|---|---|---|---|
| 7,366,715 B2 | 4/2008 | Liu et al. | |
| 7,890,526 B1 * | 2/2011 | Brewer et al. | 707/767 |
| 2001/0000356 A1 * | 4/2001 | Woods | 707/3 |
| 2004/0034632 A1 | 2/2004 | Carmel et al. | |
| 2007/0233656 A1 | 10/2007 | Bunescu et al. | |
| 2009/0083226 A1 * | 3/2009 | Kawale et al. | 707/3 |
| 2009/0271363 A1 | 10/2009 | Bayliss | |
| 2010/0145678 A1 * | 6/2010 | Csomai et al. | 704/9 |
| 2011/0035456 A1 | 2/2011 | Milne et al. | |

OTHER PUBLICATIONS

Durme et al. "Weakly-Supervised Acquisition of open-Domain Classes and Class Attributes from Web Documents and Query logs" Proceedings of ACL-08: HL T, p. 19-27, Jun. 2008.
Talukdar et al. "Weakly-Supervised Acquisition of Labeled Class Instances using Graph Random Walks" Proceedings of the 2008 Conference on Empirical Methods in Nature language Processing, p. 582-590, Oct. 2008.
Hughes et al. "Lexical Semantic Relatedness with Random Graph Walks" Proceedings of Joint Conference on Empirical Methods in Natural Language Processing and Computational Natural Language Learning, p. 581-589, Jun. 2007.

* cited by examiner

*Primary Examiner* — Sangwoo Ahn
(74) *Attorney, Agent, or Firm* — Fish & Richardson P.C.

(57) ABSTRACT

Methods, systems, and apparatus, including computer programs encoded on computer storage media, for generating query suggestions. In one aspect, a method includes receiving candidate text queries and class instance pairs and generating one or more query specializations from the candidate text queries and the class instance pairs. In another aspect, a method includes receiving a partial query entered by a user, identifying one or more query specializations for query completions for the partial query, and presenting query suggestions to the user, including presenting the identified query specializations.

34 Claims, 5 Drawing Sheets

GENERATING QUERY SUGGESTIONS USING CLASS-INSTANCE RELATIONSHIPS

CROSS-REFERENCE TO RELATED APPLICATIONS

This application claims the benefit under 35 U.S.C. §119(e) of U.S. Patent Application No. 61/295,664, titled "Generating Query Suggestions Using Class-Instance Relationships," filed Jan. 15, 2010, which is incorporated here by reference.

BACKGROUND

This specification relates to generating query suggestions for presentation to users. Internet search engines provide information about Internet accessible resources (e.g., Web pages, images, text documents, and multimedia content) that are responsive to a user's search query by returning a set of search results in response to the query. A search result may include, for example, a Uniform Resource Locator (URL) and a snippet of information for resources responsive to a query.

Some Internet search engines provide query suggestions as a user is entering a query. These query suggestions generally correspond to possible completions of the user's input.

For example, if a user types "formic acid prop," a search engine may suggest the query completion "formic acid properties." These query suggestions can be presented, for example, in a drop down box that lists the query suggestions.

SUMMARY

In general, one innovative aspect of the subject matter described in this specification can be embodied in methods that include the actions of receiving a plurality of candidate text queries and a plurality of class instance pairs, each class instance pair comprising class text naming an entity class and entity text naming a particular instance of the entity class; generating one or more query specializations from the plurality of candidate text queries and the plurality of class instance pairs, wherein each query specialization is the text of one of the candidate text queries modified so that an n-gram in the text of the candidate text query is replaced by the entity text from a class instance pair having class text matching the n-gram; and storing specialization data, the specialization data associating each of one or more of the queries with one or more query specializations identified from the query. Other embodiments of this aspect include corresponding systems, apparatus, and computer programs recorded on computer storage devices, each configured to perform the operations of the methods.

These and other embodiments can each optionally include one or more of the following features. Each class instance pair has an associated weight and the specialization data associating each of the one or more queries with one or more query specializations further associates each of the one or more query specializations with the weight of the class instance pair used to generate the query specialization. Generating a query specialization from a candidate text query and the class instance pairs includes extracting a plurality of n-grams from the candidate text query and extracting a respective context for each extracted n-gram from the candidate text query; comparing the extracted n-grams to the class text of the class instance pairs; identifying an n-gram that matches class text of a first class instance pair; and generating a query specialization from the entity text of the first class instance pair and the respective context for the identified n-gram. Extracting the plurality of n-grams comprises extracting only n-grams having a length that is less than a threshold length. The actions further include excluding from the extracted n-grams any n-grams that do not match at least one of class text and entity text in the class instance pairs. The actions further include generating only query specializations that are included on a query whitelist. The query whitelist is a list of the plurality of candidate text queries.

The actions further include receiving a plurality of documents and one or more extraction patterns; and applying the extraction patterns to the documents to derive the plurality of class instance pairs. The actions further include calculating a weight for each class instance pair according to a frequency score and a diversity score for the class instance pair.

In general, another innovative aspect of the subject matter described in this specification can be embodied in methods that include the actions of storing specialization data, the specialization data associating each of a plurality of text queries with one or more query specializations identified from the text query; receiving a partial query entered by a user; obtaining one or more candidate queries that are completions of the partial query; identifying, in the specialization data, one or more query specializations for one or more of the obtained candidate queries; and presenting query suggestions to the user, the query suggestions that include one or more of the obtained candidate queries and one or more of the identified query specializations. Other embodiments of this aspect include corresponding systems, apparatus, and computer programs recorded on computer storage devices, each configured to perform the operations of the methods.

These and other embodiments can each optionally include one or more of the following features. The actions further include determining an order for the query suggestions and presenting the query suggestions according to the order. Determining the order comprises determining an order that separates the obtained candidate queries from the query specializations. Determining the order comprises ordering the candidate queries according to a respective weight for each candidate query. Each query specialization is associated with a weight for the class instance pair from which it was generated; and the order for the one or more query specializations is determined according to the weight associated with the query specialization. Determining the order comprises determining an order such that at least one query specialization is presented between two candidate queries.

Particular embodiments of the subject matter described in this specification can be implemented so as to realize one or more of the following advantages. Diverse sets of query suggestions can be generated. These query suggestions can include query suggestions referencing specific instances of classes. Query suggestions can be generated for queries with few or no possible query completions. Users can be provided with help to submit more focused queries than the users might otherwise submit.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
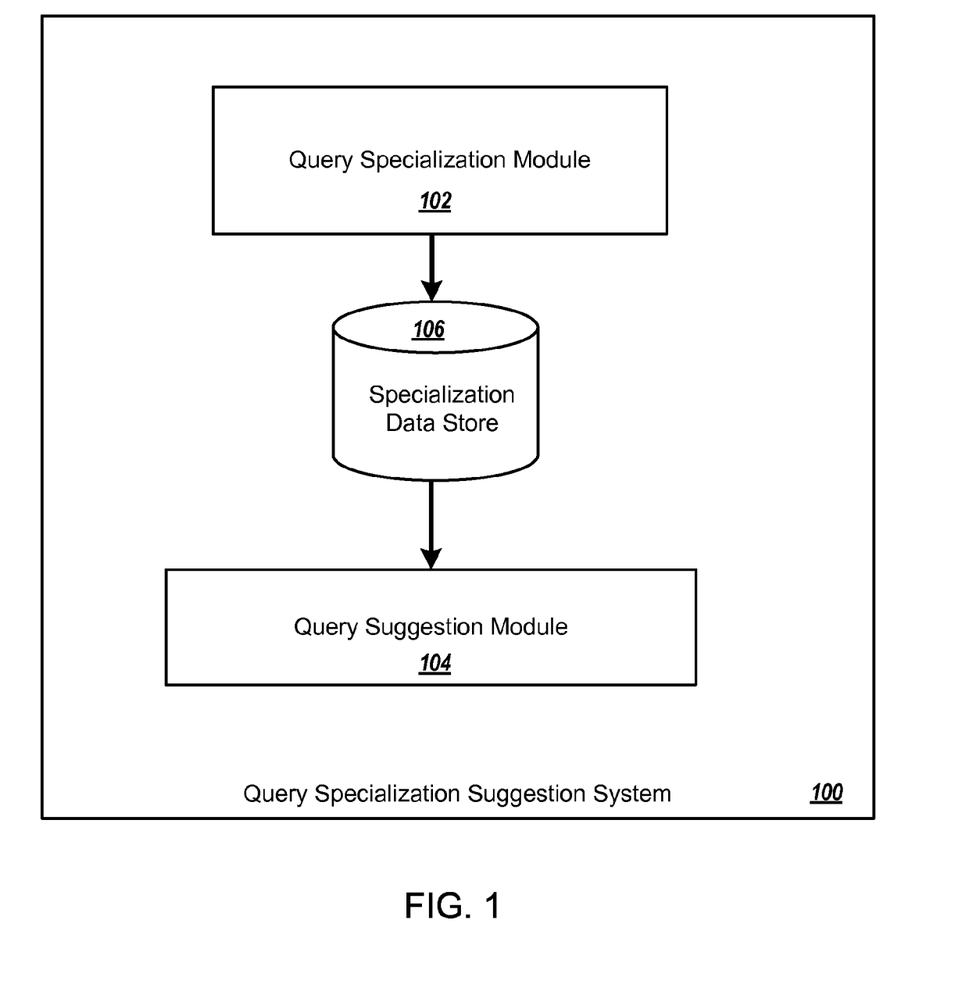
FIG. 1 illustrates an example query specialization suggestion system.

FIG. 1 illustrates an example query specialization suggestion system 100. The system 100 is a sub-system of a search system. The search system is implemented by one or more computers that receive search queries from a client device of a user, identify search results that are responsive to the queries, and present the responsive search results to the user, for example, by sending the search results to the client device for presentation to the user.

The system 100 generates query suggestions for partial queries submitted by a user. A partial query is text input entered in a query input field of a search engine user interface by a user before a user submits a search request to the search system.

The system 100 includes a query specialization module 102 and a query suggestion module 104. The query specialization module 102 processes a group of candidate queries and a group of class-instance pairs and uses the class-instance pairs to generate one or more respective query specializations for each of one or more of the candidate queries. A candidate query is text that could be submitted to a search engine as a query. A query specialization of a candidate query is a modified version of the candidate query where text referring to a general class of entities in the candidate query is replaced by text referring to a specific instance of an entity in the class. For example, "formic acid properties" has corresponding query specialization "formic acid density," because "density" is a specific instance of the class "property." An example method used to generate the query specializations is described below with reference to FIG. 2.

The system stores specialization data in a specialization data store 106. This specialization data associates candidate queries with the query specializations identified for the candidate queries by the query specialization module 102.

The query suggestion module 104 uses the specialization data in the specialization data store 106 to generate query suggestions for a partial query received from a user. The generated query suggestions include query specializations of query completions of the partial query. The query suggestions can also include other suggestions, for example, query suggestions generated using conventional methods. A query completion begins with the partial query and has one or more additional characters. For example, "formic acid properties" is a query completion of the partial query "formic acid prop." An example method for generating specialized query suggestions from query completions is described below with reference to FIG. 4.

Figure 2:
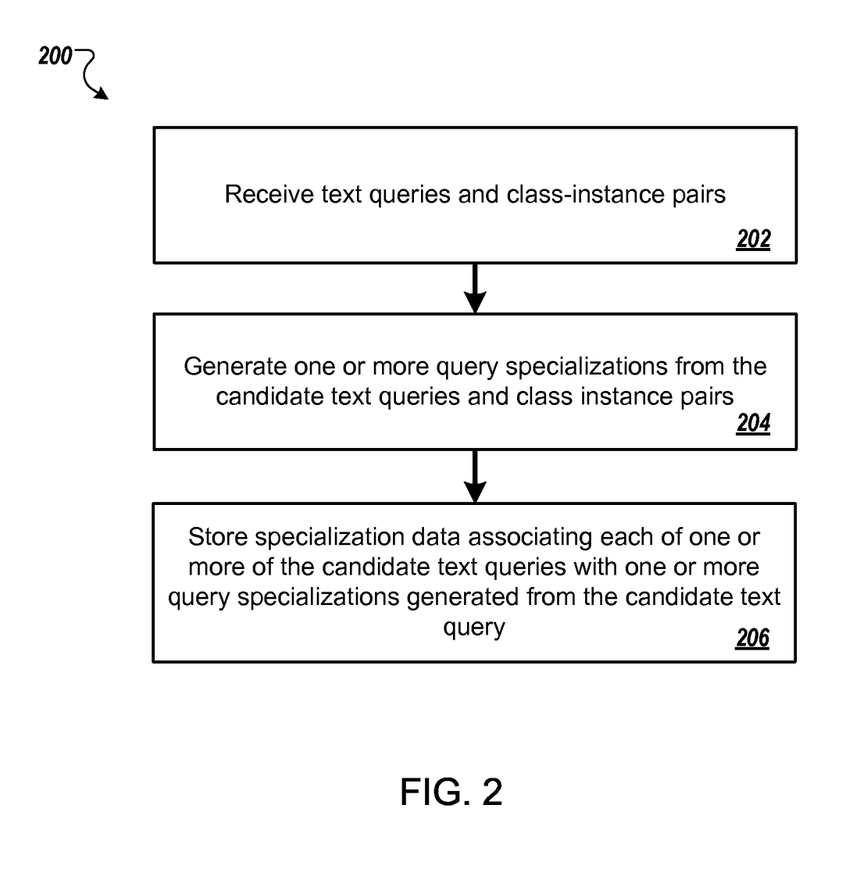
FIG. 2 is a flow chart of an example method for generating query specializations for candidate queries.

FIG. 2 is a flow chart of an example method 200 for generating query specializations for candidate queries. For convenience, the method 200 is described with reference to a data processing system that performs the method. The system can be, for example, the system 100 described in reference to FIG. 1.

The system receives candidate text queries and class-instance pairs (202). The candidate text queries are candidate queries for which the system will try to generate query specializations. In some implementations, the candidate text queries are identified from query log data indicating what queries users have submitted to a search engine over time.

For example, the candidate queries can include all queries in the query log data, or queries that appear in the query log data more than a threshold number of times. In some implementations, the candidate text queries are one or more word phrases extracted from the text of documents indexed by a search engine. For example, the candidate text queries can be all phrases that appear in document text or phrases that appear in document text more than a threshold number of times. In some implementations, the candidate text queries are identified from both query log data and the text of documents indexed by a search engine.

Each class-instance pair has class text that is a name of an entity class and entity text that is a name of an instance of the entity class. The instance of the entity class has an "is-a" relationship with the entity class; in other words, the instance of the entity class is an example of the entity class. An example class-instance pair is the pair (food, pizza), because pizza is a food. The class-instance pair data can be received from a system that generates class-instance pair data using conventional methods for identifying classes and instances. For example, the class-instance pairs can be manually generated by one or more experts, can be collaboratively generated by non-experts, or can be extracted from text documents using conventional methods.

In some implementations, the class-instance pair data was previously derived from a set of documents using pattern matching techniques. An example process for performing this extraction is described in more detail below with reference to FIG. 3.

The system generates one or more query specializations from the candidate text queries using the class-instance pairs (204). In some implementations, the system tries to generate query specializations from each of the candidate text queries, but does not necessarily identify a query specialization from each candidate text query. The system also does not necessarily use every class-instance pair when trying to generate the query specializations.

In some implementations, the system identifies the query specializations by comparing the words and phrases of the candidate queries to the class text of the class-instance pairs, and replacing matching query text with associated entity text from the matching class-instance pairs. In some implementations, two texts match when the texts are identical. In other implementations, two texts match when the texts are identical or differ only in small differences in form. For example, if one text is a singular form of a word and another text is a plural form of the word, the two texts can be considered to match.

In some implementations, the system only identifies query specializations that are on a query whitelist. In some implementations, the query whitelist is made up of all candidate queries that were received by the system; however, other query whitelists can also be used. For example, a query whitelist that is a subset of all of the candidate queries can also be used.

Some implementations of the system, the system identifies query specializations using programs implemented with a MapReduce framework and programming model. An example implementation of MapReduce is described in U.S. Pat. No. 7,650,331, to Dean et al., for "System And Method For Efficient Large-Scale Data Processing", issued Jan. 19, 2010. The system performs a series of MapReduce steps which, in combination, lead to the desired query specializations. For convenience, the description below refers to complete MapReduce steps. However, each MapReduce step actually involves a separate map step followed by a separate reduce step.

The first MapReduce step takes candidate queries as input and outputs key-value pairs for each of the candidate queries. These key-value pairs each have a key representing the context of a candidate query, and a value representing an n-gram extracted from the query. An n-gram is n consecutive words, where n is an integer greater than or equal to one. The context of a candidate query is made up of a prefix context of any words before the n-gram in the candidate query and a suffix context of any words after the n-gram in the candidate query.

For example, the candidate query "Mountain View restaurants" can be divided into the following (prefix context, n-gram, suffix context) tuples, which can be mapped to the following (key, value) pairs:

| (Prefix Context, N-Gram, Suffix) | (Key, Value) Pair |
|---|---|
| ("", "Mountain", "View restaurants") → | (("", "View restaurants"), "Mountain"), |
| ("Mountain", "View", "restaurants") → | (("Mountain", "restaurants"), "View"), |
| ("Mountain View", "restaurants", "") → | (("Mountain View", ""), "restaurants"), |
| ("", "Mountain View", "restaurants") → | (("", "restaurants"), "Mountain View"), |
| ("Mountain", "View restaurants", "") → | (("Mountain", ""), "View restaurants"), |
| ("", "Mountain View restaurants", "") → | (("", ""), "Mountain View restaurants"). |

In some implementations, the first MapReduce step filters the key-value pairs. For example, the system can filter out key-value pairs having value n-grams whose length in words exceeds a predetermined threshold, e.g., when n is greater than 8. In addition or alternatively, the system can compare each value n-gram that is extracted to the class names and instance names in the class-instance data, and filter out key-value pairs having a value n-gram that does not match a class name or an instance name in the class-instance data, e.g., by excluding those n-grams from the extracted n-grams that are used by the system. In addition or alternatively, the system can filter out key-value pairs for key contexts that are associated with more than a threshold number of value n-grams.

In some implementations, the first MapReduce step generates a condensed representation of the key-value pairs. These condensed key-value pairs have a key representing a query context and a value representing a list of all n-grams associated with that key context.

The second MapReduce step receives the key-value pairs output from the first MapReduce step as input and generates a second type of key-value pair as output. This second type of key-value pair has a key that represents a pair of n-grams sharing the same context and a value representing the shared context. The pair of n-grams in the key has an order, for example, alphabetical order. A condensed representation of this second type of key-value pair can also be generated, where the key is an n-gram pair and the value is a list of contexts shared by the n-gram pair.

Consider an example where the system receives the following two condensed key-value pairs as input from the first MapReduce step: first key-value pair:
{("", "side effects"), (("nsaids"), ("ibuprofen"))} and second key-value pair:
{("allergic reaction to", " "), (("aspirin"), ("ibuprofen"), ("nsaids"))}. The second MapReduce step generates output as follows.

The first condensed key-value pair only includes two n-grams in its list of values. Therefore, the second MapReduce step generates a single key from the first condensed key-value pair: ("ibuprofen": "nsaids"). The second MapReduce step generates an output key-value pair corresponding to this key and two context values, one for each of the received condensed key-value pairs, since both of the n-grams ibuprofen and nsaids are included in the list of values for both of the condensed key-value pairs. The two context values are therefore (" ", "side effects") and ("allergic reaction to", " ").

The second MapReduce step then generates two pairs of n-grams that have not already been generated from the second key-value pair: ("aspirin": "ibuprofen") and ("aspirin": nsaids"). The colon in the above notation is used to separate the two n-grams. The second MapReduce step generates two output pairs, each having one of the keys, and a value of ("allergic reaction to", " ").

In some implementations, the second MapReduce step first generates a mapping from context to pairs of n-grams, and then inverts the mapping to produce key-value pairs of the form described above.

In some implementations, the second MapReduce step is performed on two groups of input data. Each group of input data is generated as described above with reference to the first MapReduce step. The first group is made up of class-specific key-value pairs that only includes key-value pairs whose n-gram values match class names in the class-instance pair data. The second group is made up of instance-specific key-value pairs that only includes key-value pairs whose n-gram values match entity names in the class-instance pair data.

In these implementations, the second MapReduce step generates the set of output key-value pairs as follows. The second MapReduce step generates an output key-value pair for each pair of class-specific and instance-specific key-value pairs that have the same context key. The key of the output key-value pair is a pair of n-grams that is the n-gram value from the class-specific key-value pair and the n-gram value from the instance-specific key-value pair, in that order. The value is the context that is shared by the class-specific key-value pair and the instance-specific key value pair. For example, if the second MapReduce receives the class-specific key-value pair ((" ", "delicious"), "food") and the instance-specific key-value pair ((" ", "delicious"), "pizza"), the second MapReduce step generates the output key-value pair (("food": "pizza"), (" ", "delicious")).

The third MapReduce step receives a set of weighted class-instance pairs as input and outputs a third type of key-value pair. The key of this third type of key-value pair is class text and entity text from a class-instance pair. The keys can be sorted in alphabetical order. For example, the key representing class-instance pair ("food", "pizza") is ("food": "pizza"), while the key representing the class-instance pair ("food", "chocolate") is ("chocolate": "food"). Alternatively, the keys can maintain the class-instance ordering, where the first text in the key is the class text and the second text is the entity text. In general, the keys are ordered according to the same convention used to order the keys generated by the second MapReduce.

When the n-grams in the key are sorted in alphabetical order, the value of this third type of key-value pair specifies whether the class comes first or second in the key.

The value can also specify the weight associated with the class-instance pair. For example, for class-instance pair ("food", "pizza", 0.9), the resulting key-value pair is {("food": "pizza"), (0.9, "first element is class")}.

In some implementations, the third MapReduce step filters out class texts that are determined to be too general, for example, class texts that appear in more than a predetermined threshold number of class-instance pairs, and does not include these class texts in the resulting set of key-value pairs. In some implementations, the third MapReduce step filters out class-instance pairs that have a weight that is less than a predetermined threshold, and does not include key-value pairs for these class-instance pairs in the resulting set of key-value pairs. In some implementations, the entity texts for a given class are ranked, e.g., by their weights, and the third MapReduce step only generates key-value pairs for up to a given number of the entity texts. For example, only the first j entity texts for each class text could be used, where j is a pre-defined threshold.

The fourth MapReduce step receives two groups of key-value pairs as input. The fourth MapReduce step receives the outputs of the second MapReduce step and the third MapReduce step as input, and performs a merge, e.g., join, operation to combine the output of the second MapReduce step with the output from the third MapReduce step. For example, the fourth MapReduce step can use conventional database join techniques.

The join filters out entries whose keys are not included in both the outputs of the second MapReduce and the output of the third MapReduce. Thus, this join results in a set of key-value pairs corresponding to query specializations for particular n-grams and contexts. The key is the n-gram pair, and the value is the context for the pair. The value can optionally include additional optional information on whether the class or the instance is first in the key and the weight for the context-instance pair represented by the key.

Each of the query specializations generated by the join are also included in the candidate queries (i.e., on a query whitelist). Therefore, an implicit side effect of the join is that each of the resulting query specializations is a query on the query whitelist.

The system can then perform a final MapReduce step to identify query specializations for each of the candidate queries. The system generates the query specializations for a given candidate query by considering each key-value pair output from the fourth MapReduce step. The system generates a first candidate query and a second candidate query from the key-value pair. The first candidate query is generated by recombining the context with the first n-gram in the key. The second candidate query is generated by recombining the context with the second n-gram in the key.

In implementations where the n-grams in the key are sorted in alphabetical order, the system determines whether the class is first or second in the key. If the class is first in the key, the system identifies the second candidate query as a query specialization for the first candidate query. Otherwise, the system identifies the first candidate query as a query specialization for the second candidate query.

In implementations where the n-grams in the n-gram pair key are sorted in class-instance order, the system identifies the second candidate query as a query specialization for the first candidate query.

In both types of implementations, each query specialization for a candidate text query corresponds to the text of the candidate text query modified so that an n-gram in the text is replaced by the entity text from a class-instance pair having class text matching the n-gram.

In some implementations, the system associates a weight with each resulting query specialization. This weight can be derived from the weight associated with the class-instance pair used to generate the query specialization. For example, the weight can be the weight associated with the class-instance pair itself or a function of the weight associated with the class-instance pair, e.g., a logarithm of the weight.

Other architectures and methods for comparing the queries and class-instance data, and identifying query specializations from the comparison, including conventional search and replace methods, can also be used.

The system stores specialization data associating each of one or more of the candidate text queries with one or more query specializations generated from the query (206). In some implementations, the system automatically associates each of the one or more candidate queries with all of the query specializations identified from the candidate query (if any). In other implementations, the system compares the number of query specializations identified from each candidate query to a predetermined threshold, and only associates the specializations with the candidate query if the number satisfies, e.g., is below, the threshold.

In some implementations, the system only associates a candidate query with query specializations having a weight that satisfies a predetermined threshold. The weight of a query specialization can be derived from the weight of the class-instance pair used to generate the query specialization, as described above.

In some implementations, the system orders the query specializations for a candidate query, for example, according to the weight of the specializations or according to other metrics that indicate specialization quality. The system then associates a top number of the query specializations with the candidate query.

Once generated, the specialization data can be used to identify query specializations for use as query suggestions for a user query, as described below with reference to FIG. 4.

Figure 3:
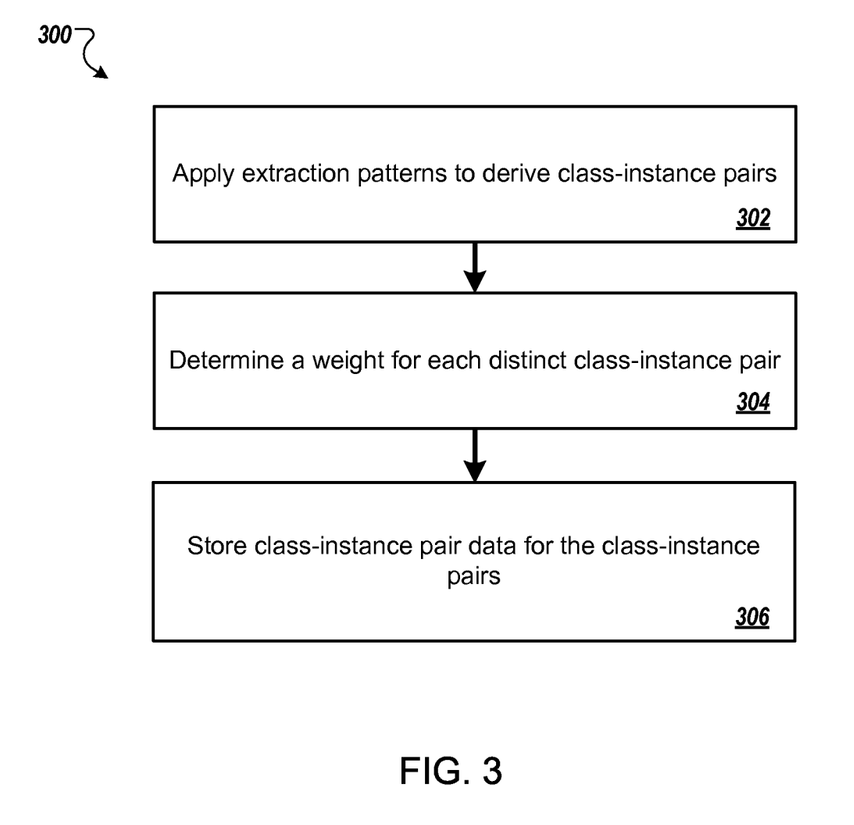
FIG. 3 is a flow chart of an example method for extracting and scoring class-instance pairs.

FIG. 3 is a flow chart of an example method 300 for deriving and scoring class-instance pairs. For convenience, the method 300 is described with reference to a system that performs the method. The system can be, for example, the system 100 described above in reference to FIG. 1, or a separate system. The class-instance pairs can be used, for example, by the query specialization process described above in reference to FIG. 2.

The system applies extraction patterns to derive class-instance pairs (302). Each extraction pattern is a pre-defined pattern for extracting class text and entity text from document text. Matching class text and entity text is extracted from the documents according to the patterns. The patterns can be applied, for example, using conventional pattern matching techniques.

Conventional patterns for extracting conceptual hierarchies from document text can be used. For example, the following pattern can be used to extract class text C and entity text I for an instance from document text:

<[ . . . ]C [such as | including | e.g. | like] I [and |, |.]>.

This pattern can be used to derive class text C="foods" and entity text I="pizza" from the sentence: "Many foods, such as pizza, are delicious."

In some implementations, the class terms C is a noun phrase identified from parts-of-speech tags applied to the terms in the document. A noun phrase is a sequence of adjectives or nouns ending in a noun. The noun can be plural or singular, depending on the form of the pattern. Example noun phrases include "food," "European banks," and "exciting afternoon trips."

In some implementations, the derived classes and instances are put in a standard form, for example, by converting all text to lowercase.

The system determines a weight for each distinct class-instance pair (304). The weight represents an estimate of a strength of relationship between the instance and the class.

The weight is derived from one or more of a frequency score for the class-instance pair and a diversity score for the class-instance pair. The frequency score is related to the number of times the class-instance pair was derived from the documents. In some implementations, the frequency score is derived from the total number of times the pair of class text C and entity text I was derived from the set of documents. In other implementations, the frequency score is derived from a number of unique phrases from which the class instance pair was extracted. The diversity score for the class-instance pair is related to the number of distinct patterns used to extract the class-instance pair. The diversity score can be the number of distinct patterns itself or a number derived by applying a function to the number of distinct patterns.

An example formula for determining the weight for a class-instance pair (C, I) is:

$$\text{Weight}(C,I) = \text{Size}(\{\text{Pattern}(C,I)\})^2 \times \text{Freq}(C,I),$$

where the size of Pattern(C, I) is the diversity score for the class-instance pair and Freq(C, I) is the frequency score for the class-instance pair.

In some implementations, the weight for a given class instance pair is further determined from a weight associated with each pattern used to extract the class instance pair. The weight for each pattern can be derived from a pre-determined estimate of the quality of the class instance pairs that are extracted using the pattern. Another example formula for determining the weight for a class-instance pair (C, I) using the pattern weights is:

$$\text{Weight}(C, I) = \text{Size}(\{\text{Pattern}(C, I)\})^2 \times \sum_{p \in \{\text{Pattern}(C,I)\}} w_p \text{Freq}((C, I), p),$$

where Pattern(C, I) is the set of patterns for which the pair (C, I) was identified, $w_p$ is the weight of pattern p, and Freq((C, I),p) is the frequency score for the number of extractions of the pair (C, I) using the pattern p.

Example techniques for scoring class-instance pairs are described in more detail in U.S. patent application Ser. No. 12/727,940, entitled "Extracting and Scoring Class-Instance Pairs," filed on Mar. 19, 2010, which is incorporated herein by reference.

The system stores class-instance pair data for the class-instance pairs (306). The class-instance pair data associates each class and instance that are in an extracted class-instance pair. In some implementations, the class-instance pair data maps each class to each instance associated with the class. In other implementations, the class-instance pair data maps each instance to each class associated with the instance.

In some implementations, the class-instance pair data also associates the class and the instance with the determined weight for the class-instance pair.

Figure 4:
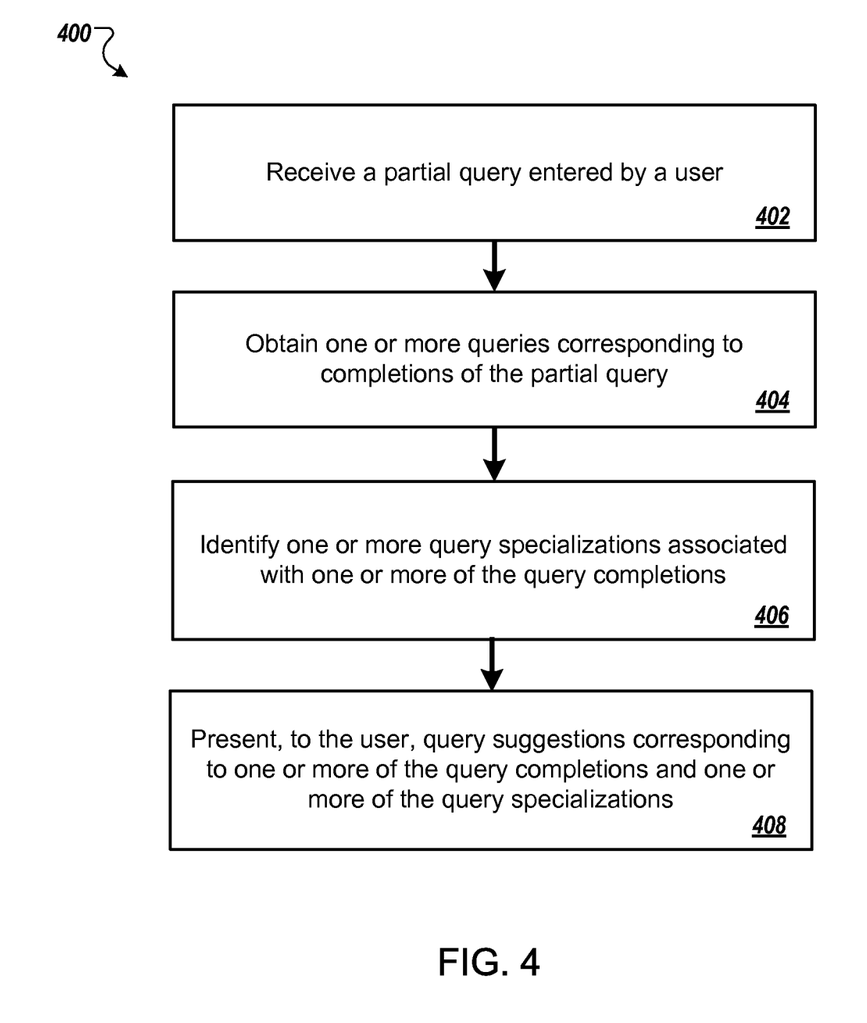
FIG. 4 is a flow chart of an example method for obtaining and presenting query suggestions to a user.

FIG. 4 is a flow chart of an example method 400 for obtaining and presenting query suggestions to a user. For convenience, the method 400 is described with reference to a system that performs the method. The system can be, for example, the system 100 described in reference to FIG. 1.

The system receives a partial query entered by a user (402). For example, the user can enter the partial query in a query input field in a search user interface provided in a web browser of a client device.

The system obtains one or more candidate queries that are completions of the partial query (404). The system can obtain these query completions, for example, from a system that had previously generated the query completions or that generates the query completions as needed, for example, using conventional methods. In some implementations, each query completion also has an associated weight that estimates a quality of the query completion, or the likelihood that, if the user completed his or her query, the resulting query would match the query completion. The weights can be received along with the query completions.

The system identifies one or more query specializations associated with one or more of the query completions (406). In some implementations, the system uses the associations in the specialization data. In other implementations, the system generates the associations as needed, for example, using the method described above with reference to FIG. 2.

The system presents, to the user, query suggestions corresponding to one or more of the query completions and one or more of the query specializations (408). In some implementations, the system presents the query suggestions by sending data to a client device of the user with instructions that the client device present the query suggestions in the search user interface of the web browser. Each query suggestion can be presented, for example, as a user-selectable element in a search user interface. When a user selects a query suggestion, the client device can submit a query for the query suggestion to a search engine. An example search user interface including user-selectable query suggestions is described below with reference to FIG. 5.

In some implementations, the system determines an order for the query suggestions and presents the suggestions according to the order. The system can implement various algorithms to determine the order for the query suggestions. In some implementations, the system only presents up to a top k number of query suggestions in the order, where k is a predetermined threshold.

In some implementations, the presentation separates the query completions from the query specializations. For example, the system can present all of the query completions before presenting any of the query specializations, or can present all of the query specializations before presenting any of the query completions. In other implementations, the query completions and query specializations may be interleaved, e.g., a query specialization can be presented between two query completions, or vice versa. In some implementations, when the presentation separates the query completions from the query specializations, the system can use different ranking heuristics to order the query completions and the query specializations. For example, in some implementations, each query completion has an associated weight that is received along with the query completion. Each query specialization has two associated weights. One weight is the weight of the query completion from which the query specialization was generated and one weight is a weight associated with the class-instance pair used to generate the query specialization from the query completion. The system uses these weights to rank the query completions according to their associated weights and to rank the query specializations according to a combination of their two associated weights.

For example, the system can generate a score used to rank a given query specialization according to the following formula:

$$\text{score} = \frac{1}{\text{rank}_S} + \frac{1}{\text{rank}_{ISA}},$$

where $\text{rank}_S$ is the rank of the query suggestion when sorted by the weight associated with its corresponding query completion and $\text{rank}_{ISA}$ is the rank of the query suggestion when sorted by the weight associated with its corresponding class-instance pair. Other scoring algorithms can also be used. For example, the system can generate a score for a given query specialization according to the following formula:

$$\text{score} = V \times F(Q) + (1-V) \times W,$$

where $F(Q)$ is the weight of the query completion used to generate the query specialization and W is the weight of the class-instance pair used to generate to the query suggestion, and V is an interpolation parameter between zero and one, inclusive.

In implementations where the presentation interleaves query suggestions and query specializations, the system can display a suggestion, followed by the query specializations for that suggestion, followed by the next suggestion. Alternatively, the system can rank each of the query suggestions and query specializations using conventional query suggestion ranking algorithms and present them according to their rank.

While the above describes query suggestions that include query completions and query specializations, in other implementations other types of query suggestions can also be presented, either alongside or instead of the query completions and query specializations. These other types of query suggestions can include, for example, other types of conventional query suggestions and query specializations that are generated from the other types of conventional query suggestions.

Figure 5:
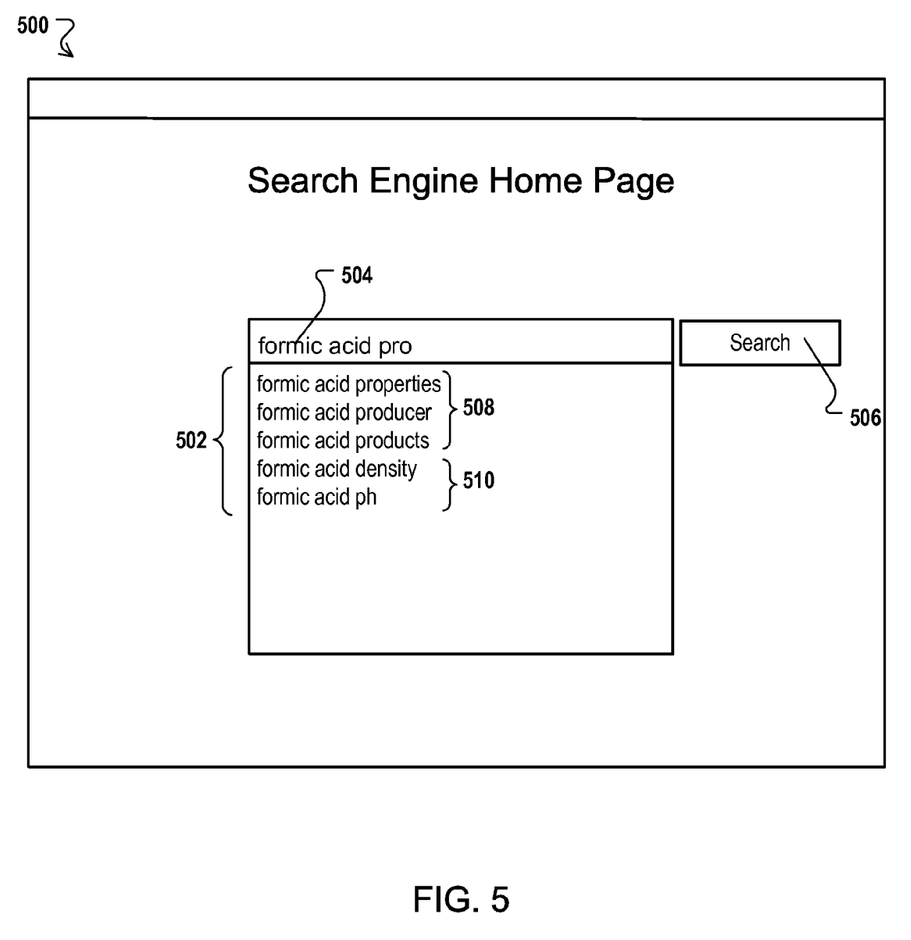
FIG. 5 illustrates an example search user interface including query suggestions for a partial query entered by a user.

FIG. 5 illustrates an example search user interface 500 including query suggestions 502 for a partial query 504 entered by a user. The example search user interface 500 is presented by a web browser executing on a client device. The partial query 504 is a partial query because the user has not yet selected the search button 506 or otherwise submitted the partial query 504 to a search engine. As the user enters the partial query 504, query suggestions appear in the drop-down box below the partial query.

The query suggestions 502 include query completions 508 that are possible completions of the partial query 504 and query specializations 510 that are possible specializations of one of the query completions. Each of the query completions 508 starts with the same text as the partial query: "formic acid pro." For illustrative purposes, both of the query specializations 510 are specializations of the query completion "formic acid properties," where "properties" has been replaced by either "density" or "ph." However, the query specializations 510 could also include specializations of the other query completions 508.

When a user selects one of the query suggestions 502, for example, with a mouse or other input device, a query for the query suggestion is sent to a search engine, which then presents search results responsive to the selected query suggestion to the user.

In some implementations, the query suggestions that are query specializations 510 are presented differently than the other query suggestions. For example, the query suggestions that are query specializations 510 can be physically separated from the other suggestions, e.g., by a line in the user interface. As another example, the query suggestions that are to query specializations 510 can be presented in different color text or in a different size or style of font. As yet another example, the query can be rewritten to emphasize the specialization. For example, query specialization "formic acid density" corresponding to the query completion "formic acid properties" can be written as "formic acid properties (density)" or "formic acid properties: density".

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions encoded on a computer storage medium for execution by, or to control the operation of, data processing apparatus. Alternatively or in addition, the program instructions can be encoded on a propagated signal that is an artificially generated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. As another example, the specialization data can be used to identify query specializations of other types of candidate queries, in addition to query completions. For example, the specialization data can be used to generate query specializations of query refinements for a query. The query refinements can be received, for example, from a system that generates refinements using conventional methods. A system can then identify query specializations for one or more of the query refinements and present the query specializations to a user along with or instead of the query refinements.

What is claimed is:

1. A system, comprising:
   one or more computers including one or more storage devices storing instructions that when executed by the one or more computers cause the one or more computers to perform operations comprising:
   obtaining a plurality of class instance pairs derived from a plurality of documents by applying one or more extraction patterns to the plurality of documents, each class-instance pair comprising class text naming an entity class and entity text naming a particular instance of the entity class;
   calculating a weight for each class-instance pair according to a frequency score and a diversity score for the class-instance pair, wherein the frequency score of the class-instance pair is based on a number of times the class-instance pair was derived from the plurality of documents, and wherein the diversity score of the class-instance pair is based on a number of distinct extraction patterns used to extract the class-instance pair;
   receiving a plurality of candidate text queries;
   generating one or more query specializations from the plurality of candidate text queries and the plurality of class-instance pairs, wherein each query specialization is the text of one of the candidate text queries modified so that an n-gram in the text of the candidate text query is replaced by the entity text from a class-instance pair having class text matching the n-gram, wherein generating a query specialization from a candidate text query and the class instance pairs comprises:

extracting a plurality of n-grams from the candidate text query and extracting a respective context for each extracted n-gram from the candidate text query, the respective context for an extracted n-gram including a prefix context and a suffix context;

comparing the extracted n-grams to the class text of the class-instance pairs;

identifying an n-gram that matches class text of a first class-instance pair; and     generating the query specialization from the entity text of the first class-instance pair and the respective context for the identified n-gram; and storing specialization data, the specialization data associating each of one or more of the candidate text queries with one or more query specializations identified from the candidate text query.

2. The system of claim 1, wherein the specialization data associating each of the one or more candidate text queries with one or more query specializations further associates each of the one or more query specializations with the weight of the class-instance pair used to generate the query specialization.

3. The system of claim 1, wherein generating the query specialization from the entity text of the first class-instance pair and the respective context for the identified n-gram includes replacing the identified n-gram with the entity text of the first class-instance pair.

4. The system of claim 1, wherein extracting the plurality of n-grams comprises extracting only n-grams having a length that is less than a threshold length.

5. The system of claim 1, wherein the instructions further cause the one or more computers to perform operations comprising excluding from the extracted n-grams any n-grams that do not match at least one of class text and entity text in the class-instance pairs.

6. The system of claim 1, wherein the instructions further cause the one or more computers to perform operations comprising generating only query specializations that are included on a query whitelist.

7. The system of claim 6 wherein the query whitelist is a list of the plurality of candidate text queries.

8. A system, comprising:

one or more computers;

a repository comprising one or more storage devices, the repository storing specialization data, the specialization data associating each of a plurality of text queries with one or more query specializations identified from the text query, wherein each query specialization is the text of one of the text queries modified so that an n-gram in the text of the text query is replaced by entity text from a class-instance pair having class text matching the n-gram, and wherein the class-instance pairs are generated by:

obtaining a plurality of class instance pairs derived from a plurality of documents by applying one or more extraction patterns to the plurality of documents, each class-instance pair comprising class text naming an entity class and entity text naming a particular instance of the entity class; and         calculating a weight for each class-instance pair according to a frequency score and a diversity score for the class-instance pair, wherein the frequency score of the class-instance pair is based on a number of times the class-instance pair was derived from the plurality of documents, and wherein the diversity score of the class-instance pair is based on a number of distinct extraction patterns used to extract the class-instance pair; and     wherein each query specialization is generated from a respective text query by:

extracting a plurality of n-grams from the text query and extracting a respective context for each extracted n-gram from the text query, the respective context for an extracted n-gram including a prefix context and a suffix context;

comparing the extracted n-grams to the class text of the class-instance pairs;

identifying an n-gram that matches class text of a first class-instance pair; and         generating the query specialization from the entity text of the first class-instance pair and the respective context for the identified n-gram; and     one or more storage devices storing instructions that when executed by the one or more computers cause the one or more computers to perform operations comprising:

receiving a partial query entered by a user;

obtaining one or more candidate queries that are completions of the partial query;

identifying, in the specialization data, one or more query specializations for one or more of the obtained candidate queries; and         presenting query suggestions to the user, the query suggestions that include one or more of the obtained candidate queries and one or more of the identified query specializations.

9. The system of claim 8, wherein the instructions further cause the one or more computers to perform operations comprising determining an order for the query suggestions and presenting the query suggestions according to the order.

10. The system of claim 9, wherein determining the order comprises determining an order that separates the obtained candidate queries from the query specializations.

11. The system of claim 10, wherein determining the order comprises ordering the candidate queries according to a respective weight for each candidate query.

12. The system of claim 11, wherein:

each query specialization is associated with the weight for the class-instance pair from which it was generated; and     the order for the one or more query specializations is determined according to the weight associated with the query specialization.

13. The system of claim 9, wherein determining the order comprises determining an order such that at least one query specialization is presented between two candidate queries.

14. A computer-implemented method, comprising:

obtaining a plurality of class instance pairs derived from a plurality of documents by applying one or more extraction patterns to the plurality of documents, each class-instance pair comprising class text naming an entity class and entity text naming a particular instance of the entity class;

calculating a weight for each class-instance pair according to a frequency score and a diversity score for the class-instance pair, wherein the frequency score of the class-instance pair is based on a number of times the class-instance pair was derived from the plurality of documents, and wherein the diversity score of the class-instance pair is based on a number of distinct extraction patterns used to extract the class-instance pair;

receiving a plurality of candidate text queries;

generating one or more query specializations from the plurality of candidate text queries and the plurality of class-instance pairs, wherein each query specialization is the text of one of the candidate text queries modified so that an n-gram in the text of the candidate text query is replaced by the entity text from a class-instance pair having class text matching the n-gram, wherein generating a query specialization from a candidate text query and the class instance pairs comprises:

extracting a plurality of n-grams from the candidate text query and extracting a respective context for each extracted n-gram from the candidate text query, the respective context for an extracted n-gram including a prefix context and a suffix context;

comparing the extracted n-grams to the class text of the class-instance pairs;

identifying an n-gram that matches class text of a first class-instance pair; and generating the query specialization from the entity text of the first class-instance pair and the respective context for the identified n-gram; and storing specialization data, the specialization data associating each of one or more of the candidate text queries with one or more query specializations identified from the candidate text query.

15. The method of claim 14, wherein the specialization data associating each of the one or more candidate text queries with one or more query specializations further associates each of the one or more query specializations with the weight of the class-instance pair used to generate the query specialization.

16. The method of claim 14, wherein generating the query specialization from the entity text of the first class-instance pair and the respective context for the identified n-gram includes replacing the identified n-gram with the entity text of the first class-instance pair.

17. The method of claim 14, wherein extracting the plurality of n-grams comprises extracting only n-grams having a length that is less than a threshold length.

18. The method of claim 14, further comprising excluding from the extracted n-grams any n-grams that do not match at least one of class text and entity text in the class-instance pairs.

19. The method of claim 14, further comprising generating only query specializations that are included on a query whitelist.

20. The method of claim 19 wherein the query whitelist is a list of the plurality of candidate text queries.

21. A computer-implemented method, comprising:

storing specialization data, the specialization data associating each of a plurality of text queries with one or more query specializations identified from the text query, wherein each query specialization is the text of one of the text queries modified so that an n-gram in the text of the text query is replaced by entity text from a class-instance pair having class text matching the n-gram, and wherein the class-instance pairs are generated by:

obtaining a plurality of class instance pairs derived from a plurality of documents by applying one or more extraction patterns to the plurality of documents, each class-instance pair comprising class text naming an entity class and entity text naming a particular instance of the entity class; and calculating a weight for each class-instance pair according to a frequency score and a diversity score for the class-instance pair, wherein the frequency score of the class-instance pair is based on a number of times the class-instance pair was derived from the plurality of documents, and wherein the diversity score of the class-instance pair is based on a number of distinct extraction patterns used to extract the class-instance pair; and wherein each query specialization is generated from a respective text query by:

extracting a plurality of n-grams from the text query and extracting a respective context for each extracted n-gram from the text query, the respective context for an extracted n-gram including a prefix context and a suffix context;

comparing the extracted n-grams to the class text of the class-instance pairs;

identifying an n-gram that matches class text of a first class-instance pair; and generating the query specialization from the entity text of the first class-instance pair and the respective context for the identified n-gram; and receiving a partial query entered by a user;

obtaining one or more candidate queries that are completions of the partial query;

identifying, in the specialization data, one or more query specializations for one or more of the obtained candidate queries; and presenting query suggestions to the user, the query suggestions that include one or more of the obtained candidate queries and one or more of the identified query specializations.

22. The method of claim 21, further comprising determining an order for the query suggestions and presenting the query suggestions according to the order.

23. The method of claim 22, wherein determining the order comprises determining an order that separates the obtained candidate queries from the query specializations.

24. The method of claim 23, wherein determining the order comprises ordering the candidate queries according to a respective weight for each candidate query.

25. The method of claim 24, wherein:

each query specialization is associated with the weight for the class-instance pair from which it was generated; and the order for the one or more query specializations is determined according to the weight associated with the query specialization.

26. The method of claim 22, wherein determining the order comprises determining an order such that at least one query specialization is presented between two candidate queries.

27. A non-transitory computer storage medium storing instructions, that when executed by data processing apparatus, cause the data processing apparatus to perform operations comprising:

obtaining a plurality of class instance pairs derived from a plurality of documents by applying one or more extraction patterns to the plurality of documents, each class-instance pair comprising class text naming an entity class and entity text naming a particular instance of the entity class;

calculating a weight for each class-instance pair according to a frequency score and a diversity score for the class-instance pair, wherein the frequency score of the class-instance pair is based on a number of times the class-instance pair was derived from the plurality of documents, and wherein the diversity score of the class-instance pair is based on a number of distinct extraction patterns used to extract the class-instance pair;

receiving a plurality of candidate text queries;

generating one or more query specializations from the plurality of candidate text queries and the plurality of class-instance pairs, wherein each query specialization is the text of one of the candidate text queries modified so that an n-gram in the text of the candidate text query is replaced by the entity text from a class-instance pair having class text matching the n-gram, wherein generating a query specialization from a candidate text query and the class instance pairs comprises:

extracting a plurality of n-grams from the candidate text query and extracting a respective context for each extracted n-gram from the candidate text query, the respective context for an extracted n-gram including a prefix context and a suffix context;

comparing the extracted n-grams to the class text of the class-instance pairs;

identifying an n-gram that matches class text of a first class-instance pair; and generating the query specialization from the entity text of the first class-instance pair and the respective context for the identified n-gram; and storing specialization data, the specialization data associating each of one or more of the candidate text queries with one or more query specializations identified from the candidate text query.

28. A non-transitory computer storage medium storing instructions, that when executed by data processing apparatus, cause the data processing apparatus to perform operations comprising:

storing specialization data, the specialization data associating each of one or more of the text queries with one or more query specializations identified from the text query, wherein each query specialization is the text of one of the text queries modified so that an n-gram in the text of the text query is replaced by entity text from a class-instance pair having class text matching the n-gram, and wherein the class-instance pairs are generated by:

obtaining a plurality of class instance pairs derived from a plurality of documents by applying one or more extraction patterns to the plurality of documents, each class-instance pair comprising class text naming an entity class and entity text naming a particular instance of the entity class; and calculating a weight for each class-instance pair according to a frequency score and a diversity score for the class-instance pair, wherein the frequency score of the class-instance pair is based on a number of times the class-instance pair was derived from the plurality of documents, and wherein the diversity score of the class-instance pair is based on a number of distinct extraction patterns used to extract the class-instance pair; and wherein each query specialization is generated from a respective text query by:

extracting a plurality of n-grams from the text query and extracting a respective context for each extracted n-gram from the text query, the respective context for an extracted n-gram including a prefix context and a suffix context;

comparing the extracted n-grams to the class text of the class-instance pairs;

identifying an n-gram that matches class text of a first class-instance pair; and generating the query specialization from the entity text of the first class-instance pair and the respective context for the identified n-gram; and receiving a partial query entered by a user;

obtaining one or more candidate queries that are completions of the partial query;

identifying, in the specialization data, one or more query specializations for one or more of the obtained candidate queries; and presenting query suggestions to the user, the query suggestions that include one or more of the obtained candidate queries and one or more of the identified query specializations.

29. The system of claim 1, wherein the frequency score is derived from a number of unique phrases from which the class-instance pair was extracted.

30. The method of claim 14, wherein the frequency score is derived from a number of unique phrases from which the class-instance pair was extracted.

31. A system, comprising:

one or more computers including one or more storage devices storing instructions that when executed by the one or more computers cause the one or more computers to perform operations comprising:

accessing a plurality of candidate text queries and a plurality of class-instance pairs, each class-instance pair comprising class text naming an entity class and entity text naming a particular instance of the entity class;

generating one or more query specializations from the plurality of candidate text queries and the plurality of class-instance pairs, wherein each query specialization is the text of one of the candidate text queries modified so that an n-gram in the text of the candidate text query is replaced by the entity text from a class-instance pair having class text matching the n-gram, wherein generating a query specialization from a candidate text query and the class instance pairs comprises:

extracting a plurality of n-grams from the candidate text query and extracting a respective context for each extracted n-gram from the candidate text query, the respective context for an extracted n-gram including a prefix context and a suffix context;

comparing the extracted n-grams to the class text of the class-instance pairs;

identifying an n-gram that matches class text of a first class-instance pair; and pair and the respective context for the identified n-gram; and storing specialization data, the specialization data associating each of one or more of the candidate text queries with one or more query specializations identified from the candidate text query, and wherein extracting a plurality of n-grams from the candidate text query and extracting a respective context for each extracted n-gram from the candidate text query comprises:

generating a first plurality of key-value pairs, each key-value pair in the first plurality of key-value pairs having a key representing a context of the candidate text query and a value representing an n-gram extracted from the candidate text query; and generating, from the first plurality of key-value pairs, a second plurality of key-value pairs, each key-value pair in the second plurality of key-value pairs having a key that represents a pair of n-grams sharing a same context and a value representing the same context; and joining the second plurality of key-value pairs with a third plurality of key-value pairs to generate a plurality of fourth key-value pairs, each key-value pair in the third plurality of key-value pairs having a key that includes class text and entity text, and a value specifying whether the class text is first or second in the key, and wherein each key-value pair in the fourth plurality of key-value pairs includes a key representing a pair of n-grams and a value representing a context.

32. The system of claim 31, wherein generating the query specialization from the entity text of the first class instance pair and the respective context for the identified n gram comprises:

for each key-value pair, generating a first query specialization from a combination of one of the n-grams represented by the key and the context represented by the value and generating a second query specialization from a combination of the other of the n-grams represented by the key and the context represented by the value.

33. A computer-implemented method, comprising:

accessing a plurality of candidate text queries and a plurality of class-instance pairs, each class-instance pair comprising class text naming an entity class and entity text naming a particular instance of the entity class;

generating one or more query specializations from the plurality of candidate text queries and the plurality of class-instance pairs, wherein each query specialization is the text of one of the candidate text queries modified so that an n-gram in the text of the candidate text query is replaced by the entity text from a class-instance pair having class text matching the n-gram, wherein generating a query specialization from a candidate text query and the class instance pairs comprises:

extracting a plurality of n-grams from the candidate text query and extracting a respective context for each extracted n-gram from the candidate text query, the respective context for an extracted n-gram including a prefix context and a suffix context;

comparing the extracted n-grams to the class text of the class-instance pairs;

identifying an n-gram that matches class text of a first class-instance pair; and generating the query specialization from the entity text of the first class-instance pair and the respective context for the identified n-gram; and storing specialization data, the specialization data associating each of one or more of the candidate text queries with one or more query specializations identified from the candidate text query, and wherein extracting a plurality of n-grams from the candidate text query and extracting a respective context for each extracted n-gram from the candidate text query comprises:

generating a first plurality of key-value pairs, each key-value pair in the first plurality of key-value pairs having a key representing a context of the candidate text query and a value representing an n-gram extracted from the candidate text query; and generating, from the first plurality of key-value pairs, a second plurality of key-value pairs, each key-value pair in the second plurality of key-value pairs having a key that represents a pair of n-grams sharing a same context and a value representing the same context; and joining the second plurality of key-value pairs with a third plurality of key-value pairs to generate a plurality of fourth key-value pairs, each key-value pair in the third plurality of key-value pairs having a key that includes class text and entity text, and a value specifying whether the class text is first or second in the key, and wherein each key-value pair in the fourth plurality of key-value pairs includes a key representing a pair of n-grams and a value representing a context.

34. The method of claim 33, wherein generating the query specialization from the entity text of the first class instance pair and the respective context for the identified n gram comprises:

for each key-value pair, generating a first query specialization from a combination of one of the n-grams represented by the key and the context represented by the value and generating a second query specialization from a combination of the other of the n-grams represented by the key and the context represented by the value.

* * * * *

UNITED STATES PATENT AND TRADEMARK OFFICE
CERTIFICATE OF CORRECTION

PATENT NO. : 8,452,795 B1
APPLICATION NO. : 12/759608
DATED : May 28, 2013
INVENTOR(S) : Finkelstein et al.

Page 1 of 1

It is certified that error appears in the above-identified patent and that said Letters Patent is hereby corrected as shown below:

In the Claims

Column 20, line 49, in Claim 31, after "pair; and" insert -- generating the query specialization from the entity text of the first class-instance --.

Signed and Sealed this
Fifteenth Day of October, 2013

Teresa Stanek Rea
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,452,795 B1 | Page 1 of 1 |
| APPLICATION NO. | : 12/759608 | |
| DATED | : May 28, 2013 | |
| INVENTOR(S) | : Finkelstein et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 129 days.

Signed and Sealed this
Sixteenth Day of December, 2014

Michelle K. Lee
*Deputy Director of the United States Patent and Trademark Office*